UNITED STATES PATENT OFFICE.

AUGUST E. NIENSTADT, OF NEW YORK, N. Y., ASSIGNOR OF ONE-HALF TO ELIZABETH E. BAUMAN, OF HOBOKEN, NEW JERSEY.

PROCESS OF DESTROYING INSECT EGGS AND LARVÆ.

No. 879,406.  Specification of Letters Patent.  Patented Feb. 18, 1908.

Application filed May 7, 1906. Serial No. 315,535.

*To all whom it may concern:*

Be it known that I, AUGUST E. NIENSTADT, a citizen of the United States, residing in New York city, in the county of New York and State of New York, have invented certain new and useful Improvements in Processes of Destroying Insect Eggs and Larvæ, of which the following is a specification.

This invention relates to the art of exterminating obnoxious insects such as mosquitos and the like. It is the special object of the invention to produce means which are adapted to relieve or rid an entire section of the country from mosquitos which are in certain States a great nuisance and rather a plague. To accomplish this desirable result, two essential conditions must prevail. First, the composition employed must be cheap and easily applied; second, the extermination of the mosquitos must not be attempted on fully developed and outgrown individuals, on the contrary, their development must be prevented by destroying the entire breed in the swamps, while they are in the stage of eggs or larvæ and before these undergo the various metamorphoses.

It is easily conceivable that the eggs or larvæ may be destroyed with less of a chemical agent than the full grown insects and relatively harmless substances may be used which will not be strong enough to endanger higher animal life or destroy vegetation, nor will obnoxious vapors arise.

Heretofore crude petroleum has been used for such purposes which is disagreeable or sulfate of copper or paris green were employed either singly or in mixtures. These latter substances are strong poisons and their use will be entirely dispensed with as soon as more harmless substances may be effectively used. This is rendered possible if the eggs or larvæ of the insects are destroyed whose delicate skins offer little resistance to even harmless agents.

Like all organic substance, the fine skins of the eggs of the insects are easily destroyed by alkaline substances which practically dissolve them. The present invention is based on this principle. A mixture of calcium hydroxid and chlorid of ammonium or, as it is commonly called sal ammoniac is used which when applied in the dry state to the swampy water will chemically act on each other in the well known way forming ammonia gas and calcium chlorid. The atomic chlorin and atomic calcium at once combine in the well known atomic composition of one calcium to two chlorin. However, the ammonia radical $NH_4$ of sal ammoniac does not find any elementary substance in an atomic condition to combine with; therefore, the ammonia formed therefrom acts very energetically and being gradually formed by the continuous action of the two components of the mixture, a high effect is attained. This ammonia which is identical in all respects with ammonia previously formed dissolves in the water. Ammonia easily evaporates from the stagnant pools because it is exposed to the atmosphere and summer heat. If the molecular proportion of both components, the calcium hydroxid and sal ammoniac, would be used, the water soon would lose its alkaline character and new eggs of mosquitos might breed therein. To avoid this, a large excess of calcium hydroxid is employed. This is soluble in water therefore the water will lastingly remain alkaline. Thus a double action is attained by this composition.

It has been attempted to use ammonia as an insecticide, but this is not so effective, first because the usual ammonia is employed while with the novel composition ammonia is produced right in the place where the eggs are to be destroyed which, as is well known, produces a stronger chemical effect; second, if the ammonia passes out of existence in the swampy water, same remains lastingly alkaline in accordance to the present invention because the excess of calcium hydroxid remains partly undissolved within the swampy water and fresh supplies of water to the swamps will find sufficient calcium hydroxid to become saturated therewith. This is of the highest importance because, according to the present invention, not only the eggs and larvæ contained in the swamps will be exterminated, in addition thereto the existence, growth, and development of future eggs or larvæ will be rendered entirely impossible in the swamps because of the lasting alkaline character of the water, whereby really whole sections of the country are relieved from this annoying plague and the cause of malaria is prevented.

As previously stated the calcium hydroxid always is largely in excess. I prefer to compound about ten parts of calcium hydroxid with one part of sal ammoniac and mix same thoroughly to obtain a uniform composition. This powder may easily be packed and stored and is always ready for use. The quantity of the mixture employed in stagnant pools of a given area and depth to successfully destroy all existing eggs or larvæ and render the pool sterile for a sufficient period of time preferably is as follows: For a pool about 40 feet long, 15 feet wide and 3 feet deep 4½ lbs. of sal ammoniac and 30 lbs. of calcium hydroxid were successfully used for destroying and killing of mosquito and other larvæ in said pool. This quantity of composition may be reduced when it is carefully distributed over the pool as, for instance, by suitable apparatus. As soon as the composition is applied to the stagnant swamps, the dissolution of its components sets in. One part of the sal ammoniac is dissolved by about 2.7 parts of water of ordinary temperature. The calcium hydroxid is not easily soluble; one part of same is dissolved by about 760 parts of cold water. Therefore, the formation of ammonia is a gradual one and extends over a certain period of time because there is not sufficient calcium hydroxid in solution to decompose the sal ammoniac quickly and a gradual evolution and dissolution of the ammonia takes place whereby a cheap, but effective destruction of the larvæ is assured.

Having thus described my invention I claim as new and desire to secure by Letters Patent,

1. The improvement in the art of destroying eggs and larvæ of mosquitos consisting in applying to the mosquito infested swamps or pools a dry composition composed of calcium hydroxid and sal ammoniac of which the calcium hydroxid is largely in excess, setting free ammonia gas by the gradual action of the components of the mixture on each other in the presence of the water of the infested swamps or pools and producing a lastingly alkaline solution.

2. The improvement in the art of destroying the eggs and larvæ of mosquitos consisting in applying to the mosquito infested swamps or pools a dry composition consisting of about 10 parts of calcium hydroxid and about one part of sal ammoniac, setting free ammonia gas by the gradual action of the components on each other in the presence of water and producing a lastingly alkaline solution.

Signed at Nos. 9 to 15 Murray street, New York, N. Y., this 4th day of May, 1906.

AUGUST E. NIENSTADT.

Witnesses:
JOHN O. SEIFERT,
FRED. J. DOLE.